INVENTOR.
Mac Levine
BY Charles R. Fay,
ATTORNEY

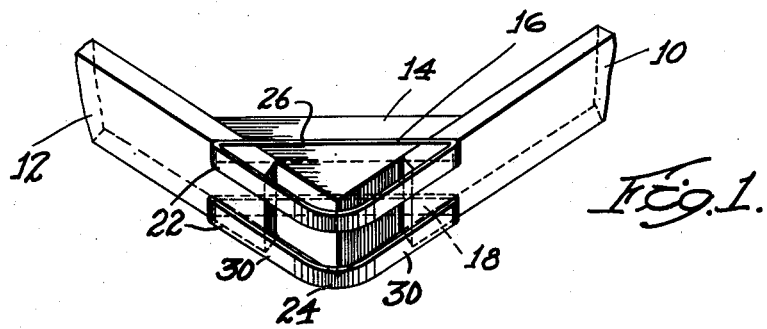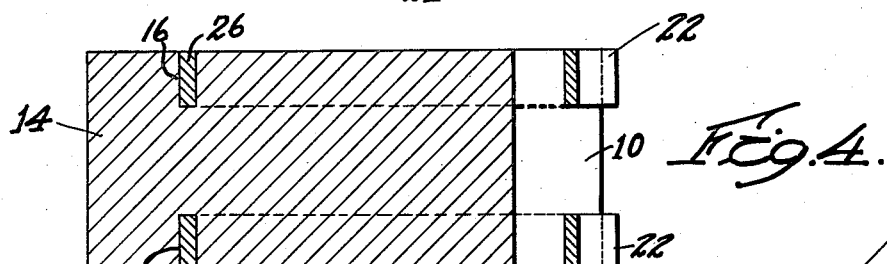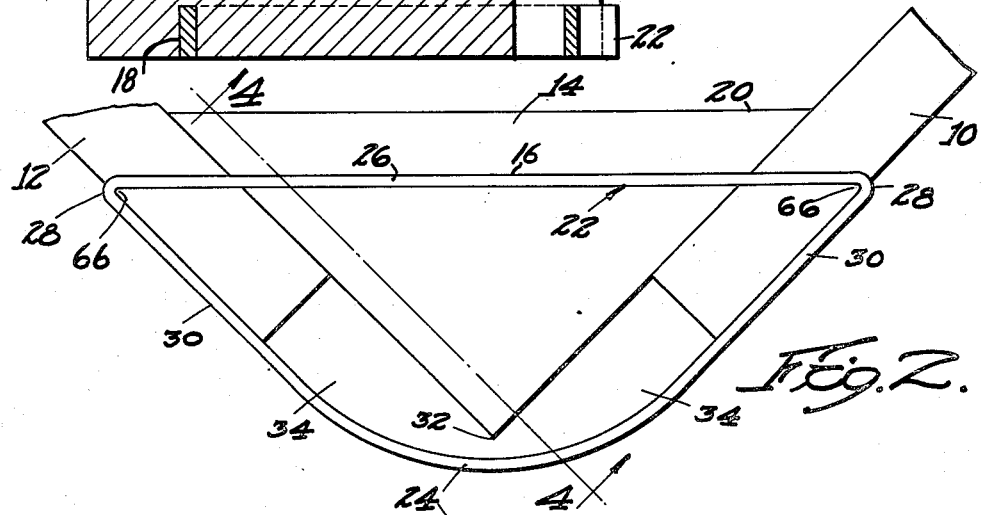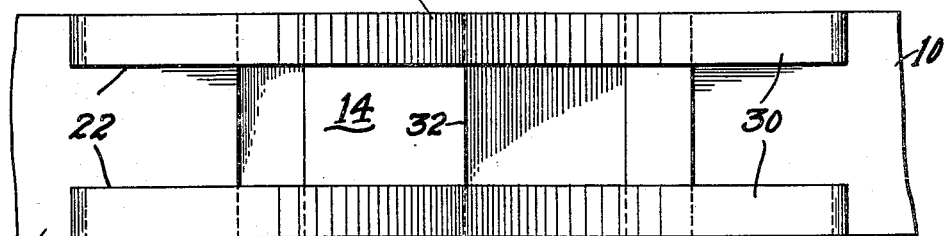

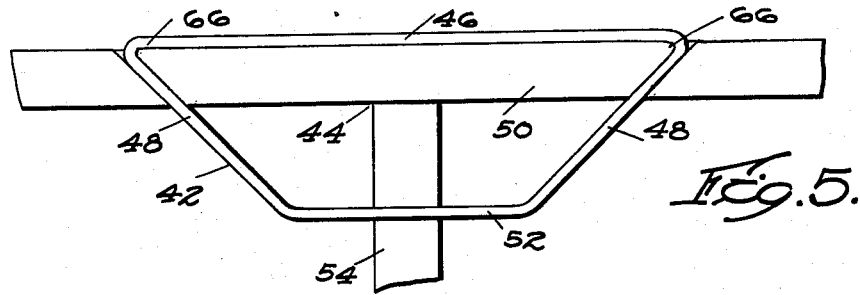
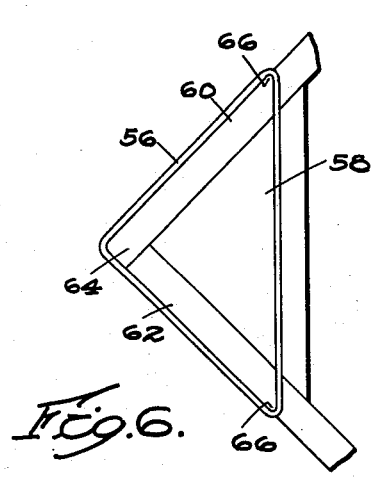
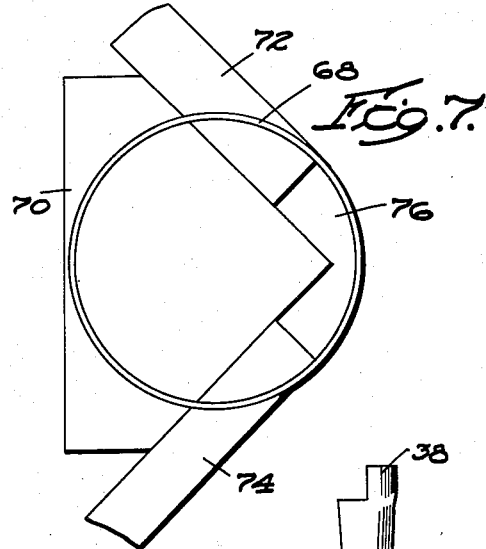
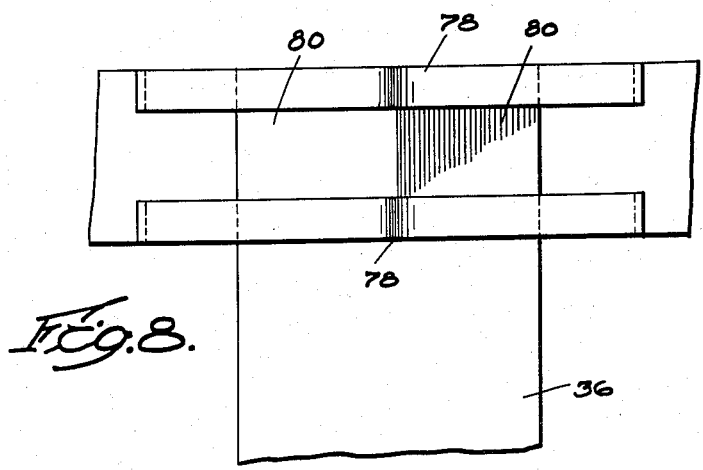
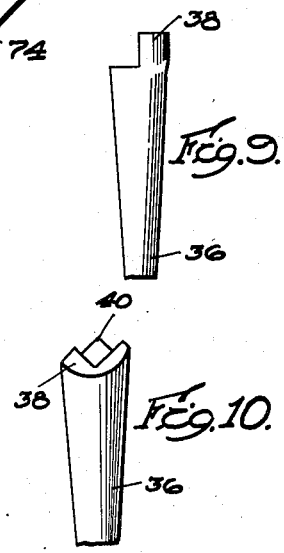
INVENTOR.
Mac Levine
BY Charles R. Fay,
Attorney Nov. 3, 1953  M. LEVINE  2,657,439
JOINT CONNECTION
Filed June 8, 1949  3 Sheets-Sheet 3

Patented Nov. 3, 1953

2,657,439

UNITED STATES PATENT OFFICE 2,657,439

JOINT CONNECTION

Mac Levine, Worcester, Mass.

Application June 8, 1949, Serial No. 97,743

3 Claims. (Cl. 20—92)

This invention relates to new and improved constructions in joint connections and the like, particularly for connecting two or more members together to form a joint such as, for instance, a corner, a T-joint, or a cross joint.

The principal object of the invention resides in the provision of a joint construction which is particularly adapted to but not limited to making joints for furniture and particularly for bed frames as, for instance, in spring bases commonly known as box springs, although it is to be clearly understood that the invention is not limited in this way but may be practiced wherever it may be found desired or convenient.

Another object of the invention resides in the provision of a joint comprising a plurality of members adapted to be secured together and resting on their edges, in spaced relation, there being a corner block connecting the members, and in the provision of slots in the edges of the members, a band being inserted in the slots and passing across the gap defined by the space between the members; the provision of a joint as aforesaid wherein the band is exposed and curved at the portion thereof that passes across the gap to produce a rounded corner and improving the ornamental appearance thereof or providing a convenient support for securement of covering material; and the provision of a strong, neater and in all ways better and greatly improved joint of the class described.

Still further objects of the invention include the provision of a joint as above described wherein the band is connected at its meeting ends by an overlapping plate welded or otherwise secured to the ends of the band to connect the same, said plate having a pair of spaced ears upstanding therefrom, each ear being provided with a hole near the top of the corner block, to receive the lowermost run of a bed spring, and anchor the same firmly to the bed spring frame without the necessity for any further fastening means, said plate having a flange overlying the corner block for securement mechanically thereto as by nails.

Other objects and advantages of the invention will appear hereinafter.

Reference is to be had to the accompanying drawings in which

Fig. 1 is a perspective view of a joint according to the present invention, parts being broken away;

Fig. 2 is an enlarged top plan view of the joint of Fig. 1;

Fig. 3 is a front view thereof;

Fig. 4 is a section on line 4—4 of Fig. 2;

Fig. 5 is a top plan view of a modified joint;

Fig. 6 shows a further modification;

Fig. 7 shows a still further modification thereof;

Fig. 8 is a front edge view of a joint according to Fig. 1 but having a modified joint member construction;

Fig. 9 is an edge view of one form of table leg or the like which may be used with the present joint;

Fig. 10 is a perspective view of the leg of Fig. 9;

Figure 11:
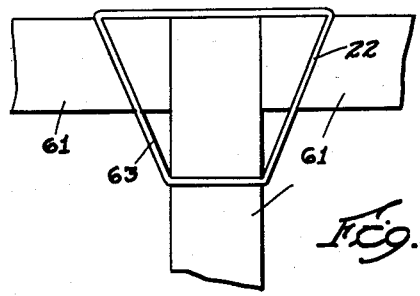
Fig. 11 shows another type of joint.

The present invention relates to a joint for a plurality of members and particularly relates but it is not limited to corner joints. One of the main benefits to be derived by the present joint construction resides in the furniture art as, for instance, corner joints for the legs of chairs and tables. On the other hand, the present joint is also particularly useful in any kind of furniture or other construction and one of these is in the base or box spring art for beds, the invention providing a great many advantages over the prior art.

In Fig. 1, there is shown a pair of members 10 and 12 which are located at angles to each other, this angle being shown for purposes of illustration as a right angle and the members 10 and 12 being jointed by a corner piece or block 14 of triangular shape.

It is desired that these pieces be firmly joined together and at the same time provide a round corner, as for instance, for upholstery purposes or the like or for the purposes of improved appearance and ornamentation as will be explained below, as well as for increased strength of the joint and increased strength of the article in which the joint is located by reason of the fact that the members 10 and 12 may be located on edge in vertical relation instead of being secured together in horizontal relation, the latter usually being the case.

The joint members 10 and 12 and 14 are provided with slots or kerfs as at 16 and 18, one slot being located in the top of the joint and one at the bottom, as clearly shown in Fig. 1, the slots being alined and for purposes of illustration, the slot in the triangular piece 14 is parallel to the base 20 thereof while the slots in the members 10 and 12 are placed therein at angles thereto, as most clearly shown in Fig. 2.

It is to be noted that the depth of the slots is not particularly critical but as will be apparent the slots must not approach too closely and should leave sufficient material therebetween to carry the load.

It has been found that in all corner joints of furniture and the like, the material left between the slots is many times that needed for purposes of strength at the particular location as shown.

It will be noted that the slots are continuous from member 10, through block 14 and through member 12.

A generally triangular band indicated at 22 is adapted to be inserted in the slots and is provided with a rounded portion instead of a point at the exposed location thereof 24. The band 22 is provided with a long straight section 26 disposed in the slot 16 and at the ends of the section 26 the same is bent as at 28 to form straight sections 30 running along the sides of the members 10 and 12 toward the corner itself, merging into the rounded portion 24, which as shown in Fig. 2, is approached by the corner 32 of the corner block 14.

Figure 12:
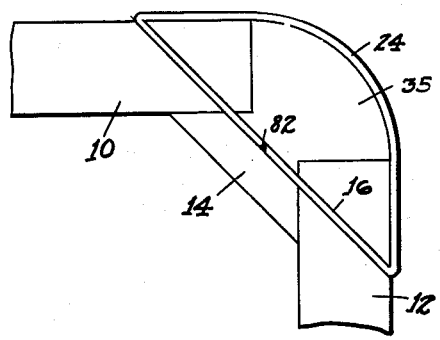
Fig. 12 illustrates a corner joint with a solid corner block.
Figure 13:
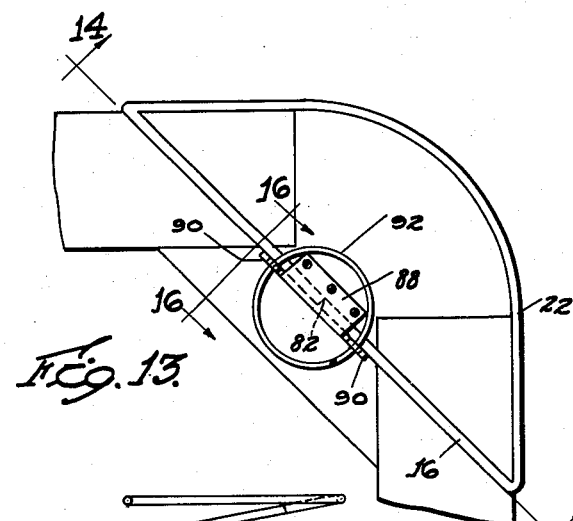
Fig. 13 is a plan view of a corner joint with the spring anchor and band connector.
Figure 14:
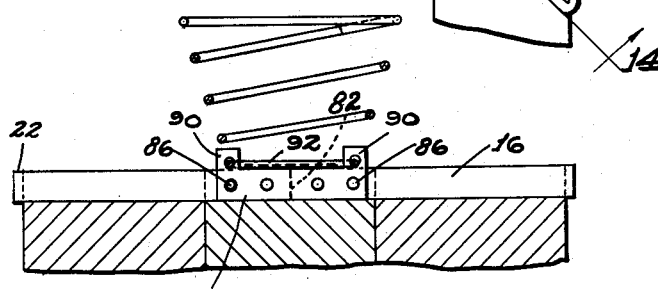
Fig. 14 is a section on line 14—14 of Fig. 13.
Figure 16:
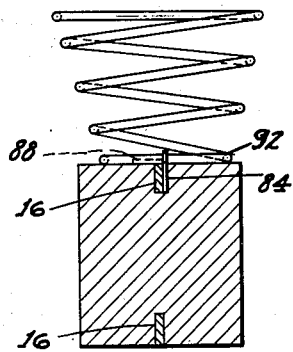
Fig. 16 is a section on line 16—16 of Fig. 13.
Figure 15:
Fig. 15 is a perspective view of the spring anchor and band connector.

It will be noted that the members 10 and 12 terminate short of the point of the corner piece at 32 and that, therefore, the corner itself is completely rounded leaving a space at each side of the point 32, as indicated at 34, but this space may be occupied by a shaped block 35, see Fig. 12, or a concealing ornamental sheet may be inserted under the bands.

This particular joint has a great many advantages among them being increased strength, ease and accuracy of assembly and improved appearance; also, however, it is pointed out that in making a base or box spring the parts 10 and 12 may come in the usual six foot lengths and a base or box spring may be the usual six foot and two to four inches. In the customary manufacture of these base springs, the members 10 and 12 are laid horizontally one on the other and connected and then have to be rounded off, all of which is avoided in the present invention and, at the same time, the members 10 and 12 being on edge are many times stronger in the direction of the loading as needed in this art, than will be the horizontal members of the prior art just above explained.

The joint itself as exemplified in Fig. 1, is ornamental in nature comprising as it does the usually wooden members 10, 12 and 14 and the metal bands which are exposed at the front thereof. It is to be clearly noted that the corner block 14 may be extended downwardly to form a leg either for a base spring or a chair, table or the like; on the other hand, the triangular corner block 14 may be left as it is and the space 34 may be taken up by means at the upper end of a leg as, for instance, as clearly shown in Figs. 9 and 10, where the leg is shown at 36 and the inner engaging part at 38 fits into the space 34 and is connected thereto by the bands, whereas, the horizontal shoulder at 40 serves as a support for the corner block 14 so as to support the device.

The bands may take many shapes, one of them being in the shape of a parallelogram, as clearly shown at 42 in Fig. 5 and in this case the band may be used as a connection to a T-joint 44, the part of the band 46 being exposed and the ends being bent inwardly toward each other as at 48 and lying in slots in the member 50, the arms 48 merging into the inner member 52 traversing a slot in the member 54 to complete the joint.

Also, the band may assume the shape of a triangle, see Fig. 6, at 56, wherein a member 58 is exactly like that a 14 but in this case the members 60 and 62 come together in a solid joint as at 64. In this case the slots in the member 58 are exactly like those in the corner block 14 and the slots in the members 60 and 62 are exactly the same as in the members 10 and 12 in Fig. 1. A variation of this joint is shown in Fig. 11, wherein the three pieces 61 are connected by a properly shaped band 63.

In this connection, it is to be noted that the bands are all made so that the corners at 66 in all cases are compressed to at least a slight degree since the inside angles of the bands are rounded but the slots terminate in sharp points as would be the case if they were to be made by a conventional saw slot or kerf. In this manner, the bands closely engage and hold the members together. In addition cross pins may be used merely to hold the bands from dropping out of the slots if such should ever be the tendency.

A still further modification is shown in Fig. 7, in which the band 68 is circular or continuously curved. In this case the slot in the corner-brace 70 is on the arc of a circle as are also the slots in the members 72 and 74 making up the corner, but the space 76 is substantially the same as the space at 34 and may be used for the same purpose.

It is also pointed out that the space 34 may be filled with an ornamental block so that the entire joint is solid and is ornamented by the bands as in Fig. 12 and at 78 in Fig. 8, the spaces indicated at 34 in Fig. 2 and 76 in Fig. 7 being filled as at 80 in Fig. 8 as, for instance, by some contrasting material to form an ornamental joint as well as a novel construction.

It will be seen that this invention provides a new and novel joint which is stronger both because of its construction and because of the fact that it permits the use of the members 10 and 12, for instance, on edge arranged vertically rather than flat and horizontally; the joint is extremely ornamental and may be used with or without a leg or with or without extra ornamental means, such as described at 80 in Fig. 8.

Also, the bands and the joint may assume many different shapes as indicated above, those disclosed not being exclusive, but only illustrative.

Figs. 13 to 16 illustrate a feature which is useful not only to connect the free ends of the band 22 which meet at 82 for instance, but also to anchor the bands to the corner blocks and to anchor the coil springs firmly to the frame.

A plate 84 is secured to the ends of the band in overlapping relation, as by welding, or any other convenient means as indicated at 86, thus finishing the band and making it continuous. A flange 88 on the plate overlies the corner block and is nailed thereto or otherwise secured, and a pair of apertured ears 90 receive the lowermost coil 92 of a cone bed spring which is threaded first through one hole and then through the other by a turning motion. This, of course, locks or anchors the spring to the base frame and eliminates the necessity for special spring anchors. Thus the plate 84 provides a triple function; it secures the ends 82 of the band in abutted relation; it secures the band to the corner block; and it locks the spring to the frame.

Having thus described my invention and the advantages thereof, I do not wish to be limited to the details herein disclosed otherwise than as set forth in the claims, but what I claim is:

1. A joint construction comprising a plurality of members arranged at an angle to each other, each member having an inner side surface facing a corresponding inner side surface of the other member, and an opposite outer side surface, and a corner block located in the included angle between the members, said members having their inner side surfaces facing each other in parallel overlapping contacting relation to the adjacent side surfaces of the corner block, each member having an edge exposed slot and the corner block having an exposed slot in alignment with the slots in the members, said combined slots forming in effect a single continuous slot from the outer side surface of one member, across the corner block, and intersecting the outer side surface of the other member, and a continuous closed endless band having a part thereof in the slot, said band extending out from the ends of the said combined slot and extending along the outer side surfaces of the members defining the joint, the part of the band extending out of combined slot being exposed and visible.

2. The joint construction of claim 1 including a second band similar to the first-named band, one band being located in the topmost portion of the joint and the other being located in the lowermost portion thereof.

3. The joint construction of claim 1 wherein the slots are curved.

MAC LEVINE.

References Cited in the file of this patent

UNITED STATES PATENTS

| Number | Name | Date |
|---|---|---|
| 122,158 | Collins et al. | Dec. 26, 1871 |
| 434,229 | Arnold | Aug. 12, 1890 |